United States Patent
Gupta et al.

(10) Patent No.: US 10,698,866 B2
(45) Date of Patent: Jun. 30, 2020

(54) SYNCHRONIZING UPDATES ACROSS CLUSTER FILESYSTEMS

(71) Applicant: International Business Machines Corporation, Armonk, NY (US)

(72) Inventors: Karan Gupta, San Jose, CA (US); Manoj P. Naik, San Jose, CA (US); Frank B. Schmuck, Campbell, CA (US); Mansi A. Shah, Sunnyvale, CA (US); Renu Tewari, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 14/969,574

(22) Filed: Dec. 15, 2015

(65) Prior Publication Data

US 2016/0103850 A1  Apr. 14, 2016

Related U.S. Application Data

(63) Continuation of application No. 13/589,256, filed on Aug. 20, 2012, now Pat. No. 9,235,594, which is a (Continued)

(51) Int. Cl.
  *G06F 16/178* (2019.01)
  *G06F 16/23* (2019.01)
  *G06F 11/14* (2006.01)

(52) U.S. Cl.
  CPC ........ *G06F 16/178* (2019.01); *G06F 11/1471* (2013.01); *G06F 16/2365* (2019.01); *G06F 16/2379* (2019.01)

(58) Field of Classification Search
  CPC .......... G06F 17/3023; G06F 17/30088; G06F 17/30212; G06F 17/30144;
  (Continued)

(56) References Cited

U.S. PATENT DOCUMENTS 6,144,999 A    11/2000  Khalidi et al.
6,434,681 B1    8/2002  Armangau
(Continued)

FOREIGN PATENT DOCUMENTS

CN         101833486 A      9/2010

OTHER PUBLICATIONS

Sundararaman et al., Membrane: Operating System Support for Restartable File Systems, ACM Transactions on Storage, vol. 6, No. 3, Sep. 2010, pp. 1-30.

*Primary Examiner* — Dennis Truong
(74) *Attorney, Agent, or Firm* — Lieberman & Brandsdorfer, LLC (57) ABSTRACT

The embodiments described herein relate to synchronization of data in a shared pool of configurable computer resources. One or more consistency points are created in a source filesystem. A first consistency point is compared with a second consistency point to detect a directory change at the source filesystem, which includes identifying at least one difference between the first and second consistency points. A file level change associated with an established directory at a target filesystem is identified responsive to the detection of the directory change. A link is established between the source filesystem and the target filesystem, and the established directory is updated based on the file level change.

20 Claims, 9 Drawing Sheets

Related U.S. Application Data continuation of application No. 13/305,784, filed on Nov. 29, 2011, now abandoned.

(58) Field of Classification Search
CPC .......... G06F 17/30575; G06F 2201/84; G06F 11/1471; G06F 11/1469; G06F 11/1448; G06F 11/1446; Y10S 707/99953; Y10S 707/99954; Y10S 707/99955
USPC ....... 707/639, 624, 681, 679, 682, 649, 674, 707/680, 640, 683, 684, 685, 999.202, 707/999.204; 711/162
See application file for complete search history.

(56) References Cited

U.S. PATENT DOCUMENTS

| | | | |
|---|---|---|---|
| 6,993,539 B2 | 1/2006 | Federwisch et al. | |
| 7,100,089 B1 | 8/2006 | Phelps | |
| 7,546,364 B2 | 6/2009 | Raman et al. | |
| 7,546,431 B2 | 6/2009 | Stacey et al. | |
| 7,567,991 B2 | 7/2009 | Armangau et al. | |
| 7,657,582 B1* | 2/2010 | Cram | G06F 11/1435 707/640 |
| 7,720,801 B2* | 5/2010 | Chen | G06F 11/2066 707/613 |
| 7,769,722 B1* | 8/2010 | Bergant | G06F 11/2097 707/681 |
| 7,797,582 B1 | 9/2010 | Stager et al. | |
| 7,809,691 B1* | 10/2010 | Karmarkar | G06F 11/1469 707/674 |
| 8,027,958 B1* | 9/2011 | Chapman | G06F 11/1451 707/639 |
| 8,082,232 B2* | 12/2011 | Okada | G06F 11/1469 707/682 |
| 8,095,511 B2* | 1/2012 | Zwilling | G06F 11/1451 707/649 |
| 8,121,981 B2* | 2/2012 | Simek | G06F 11/1469 707/649 |
| 8,200,638 B1* | 6/2012 | Zheng | G06F 11/1464 707/679 |
| 8,527,462 B1* | 9/2013 | Talius | G06F 17/30144 707/639 |
| 2003/0182313 A1* | 9/2003 | Federwisch | G06F 11/2066 |
| 2003/0182325 A1* | 9/2003 | Manley | G06F 11/2066 |
| 2004/0267836 A1 | 12/2004 | Armangau | |
| 2004/0268068 A1* | 12/2004 | Curran | G06F 11/1451 711/162 |
| 2005/0015416 A1* | 1/2005 | Yamagami | G06F 11/1471 |
| 2005/0033777 A1* | 2/2005 | Moraes | G06F 17/30575 |
| 2005/0262097 A1* | 11/2005 | Sim-Tang | G06F 17/30085 |
| 2006/0047715 A1* | 3/2006 | Parizeau | G06F 17/30353 |
| 2006/0053139 A1 | 3/2006 | Marzinski et al. | |
| 2006/0112219 A1* | 5/2006 | Chawla | G06F 3/0607 711/114 |
| 2008/0228879 A1* | 9/2008 | Cardone | H04L 67/36 709/205 |
| 2008/0256138 A1* | 10/2008 | Sim-Tang | G06F 11/1435 |
| 2009/0177718 A1* | 7/2009 | Patterson | G06F 11/1458 |
| 2009/0240744 A1 | 9/2009 | Thomson et al. | |
| 2009/0307277 A1* | 12/2009 | Grubov | G06F 11/1451 |
| 2009/0307373 A1 | 12/2009 | Cardone et al. | |
| 2010/0114847 A1* | 5/2010 | Giampaolo | G06F 11/1474 707/695 |
| 2010/0145909 A1* | 6/2010 | Ngo | G06F 11/1471 707/611 |
| 2010/0257142 A1* | 10/2010 | Murphy | G06F 11/1453 707/681 |
| 2011/0016085 A1* | 1/2011 | Kuo | G06F 17/30212 707/615 |
| 2011/0082835 A1 | 4/2011 | Agrawal | |
| 2011/0276578 A1* | 11/2011 | Allalouf | G06F 3/0604 707/755 |
| 2012/0011176 A1* | 1/2012 | Aizman | G06F 17/30203 707/822 |
| 2012/0317074 A1 | 12/2012 | Ngo | |
| 2013/0036214 A1* | 2/2013 | Carmel | G06F 11/3051 709/223 |
| 2013/0117237 A1* | 5/2013 | Thomsen | G06F 17/30377 707/683 |
| 2013/0124798 A1* | 5/2013 | Aszmann | G06F 3/0689 711/114 |

\* cited by examiner

SYNCHRONIZING UPDATES ACROSS CLUSTER FILESYSTEMS

CROSS REFERENCE TO RELATED APPLICATION(S)

This application is a continuation patent application of U.S. patent application Ser. No. 13/589,256 filed on Aug. 20, 2012, titled "Synchronizing Updates Across Cluster Filesystems," which is a continuation patent application claiming the benefit of the filing date of U.S. patent application Ser. No. 13/305,784 filed on Nov. 29, 2011, and titled "Synchronizing Updates Across Cluster Filesystems," which are both hereby incorporated by reference.

BACKGROUND

The embodiments described herein relate to data synchronization across cluster filesystems. More specifically, the embodiments described herein relate to tracking changes in a filesystem and replaying the changes to another filesystem using a standard protocol.

In a scalable and writable caching system that caches remote file data, data is fetched from a remote site and updates made at the cache site, also known as the source site, and replayed at the remote site, also known as the target site. It is known that network connectivity between the source and target sites may be subject to temporary disconnects. When a disconnection between the two sites occurs, the source site should still be available for access to data that is previously cached, and as such, the source site continues to support both data and metadata updates. At such time as connectivity between the two sites is restored, the data and metadata updates need to be synchronized to the target site.

SUMMARY

The embodiments described herein include a method, a system, and a computer program product for synchronization of update data and metadata from a source data site in communication with a shared pool of configurable computing resources to a target data site.

According to one aspect, a method is provided for synchronization of the update data. One or more consistency points are created in a source filesystem, including creating a first consistency point at a first point-in-time and a second consistency point at a second point-in-time. Each consistency point represents filesystem data and metadata at a point-in-time to establish a recovery point, and the first and second consistency points are any two consistency points. The first consistency point is compared with the second consistency point to detect a directory change at the source filesystem, which includes identifying at least one difference between the first and second consistency points. A file level change associated with an established directory at a target filesystem is identified responsive to the detection of the directory change. A link is established between the source filesystem and the target filesystem, and the established directory is updated based on the file level change.

According to another aspect, a system is provided to synchronize update data. The system includes a server having a processing unit in communication with memory. The server is associated with a source filesystem. A functional unit is in communication with the server. The functional unit creates one or more consistency points in the source filesystem, including the functional unit to create a first consistency point at a first point-in-time and a second consistency point at a second point-in-time. Each consistency point represents filesystem data and metadata at a point-in-time to establish a recovery point, and the first and second consistency points are any two consistency points. The functional unit compares the first consistency point with the second consistency point to detect a directory change at the source filesystem, which includes the functional unit to identify at least one difference between the first and second consistency points. The functional unit identifies a file level change associated with an established directory at a target filesystem responsive to the detection of the directory change. The functional unit establishes a link between the source filesystem and the target filesystem, and updates the established directory based on the file level change.

According to yet another aspect, a computer program product is provided to synchronize update data. The computer program product includes a computer-readable storage device having computer-readable program code embodied therewith. The program code is executable by a processor to create one or more consistency points are created in a source filesystem, including program code to create a first consistency point at a first point-in-time and a second consistency point at a second point-in-time. Each consistency point represents filesystem data and metadata at a point-in-time to establish a recovery point, and the first and second consistency points are any two consistency points. The first consistency point is compared with the second consistency point to detect a directory change at the source filesystem, which includes identifying at least one difference between the first and second consistency points. A file level change associated with an established directory at a target filesystem is identified responsive to the detection of the directory change. A link is established between the source filesystem and the target filesystem, and the established directory is updated based on the file level change.

Other features and advantages of the embodiments will become apparent from the following detailed description, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components of the embodiments described herein, as generally described and illustrated in the Figures herein, may be arranged and designed in a wide variety of different configurations. Thus, the following detailed description of the embodiments of the apparatus, system, and method, as presented in the Figures, is not intended to limit the scope of the embodiments, as claimed, but is merely representative of selected embodiments.

The functional unit(s) described herein have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a data mover, a replication manager, a migration manager, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring the aspects described herein.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Figure 1:
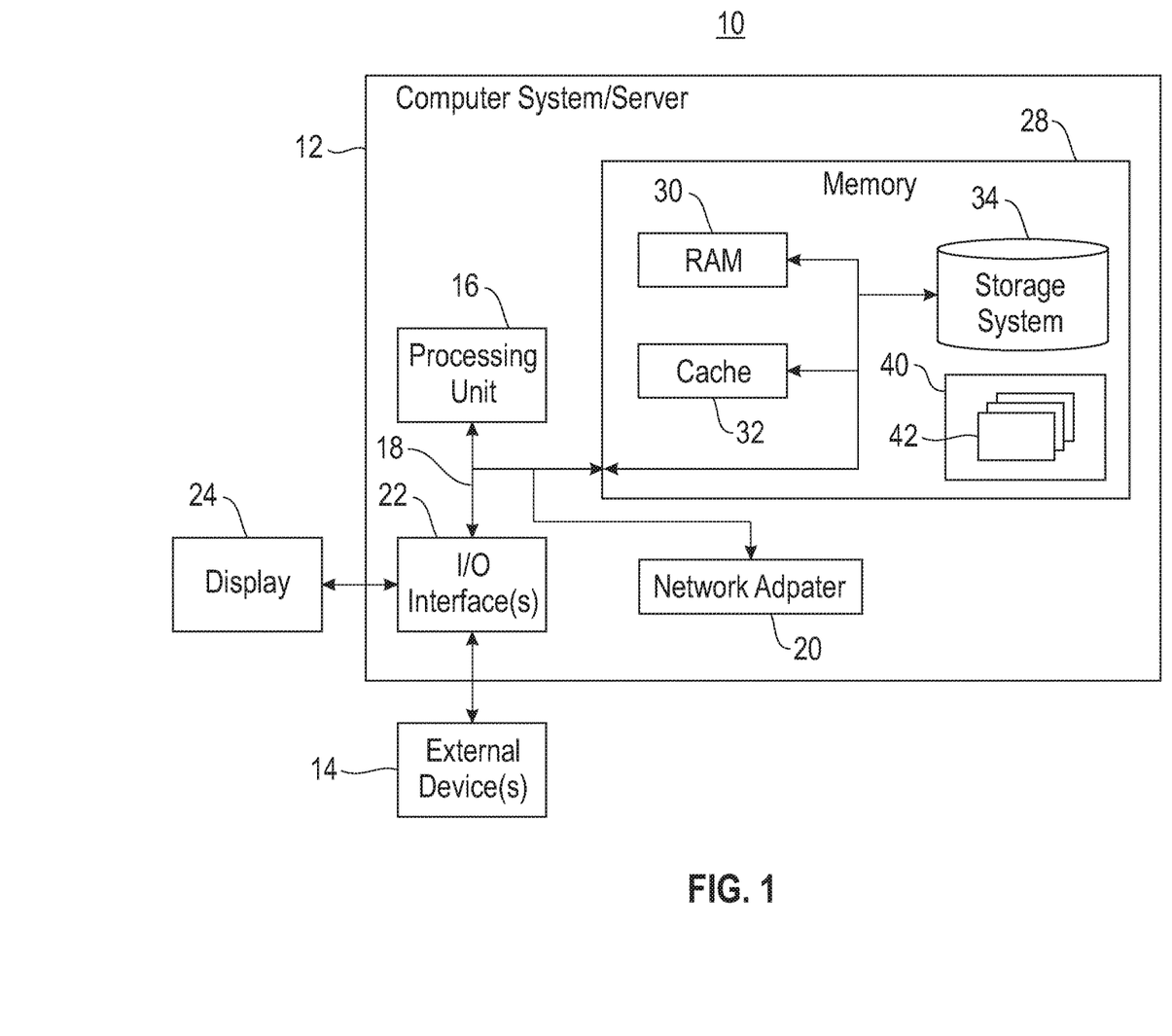
FIG. 1 depicts a cloud computing node according to an embodiment.

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node (10) is only one example of a suitable cloud computing node and is not intended to suggest any limitation as to the scope of use or functionality of the embodiments described herein. Regardless, cloud computing node (10) is capable of being implemented and/or performing any of the functionality set forth hereinabove. In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16). Bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM) (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of the embodiments.

Program/utility (40), having a set (at least one) of program modules (42), may be stored in memory (28) by way of example, and not limitation, as well as an operating system, one or more application programs, other program modules, and program data. Each of the operating systems, one or more application programs, other program modules, and program data or some combination thereof, may include an implementation of a networking environment. Program modules (42) generally carry out the functions and/or methodologies of the embodiments described herein.

Computer system/server (12) may also communicate with one or more external devices (14), such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output (I/O) interfaces (22). Still yet, computer system/server (12) can communicate with one or more networks such as a local area network (LAN), a general wide area network (WAN), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
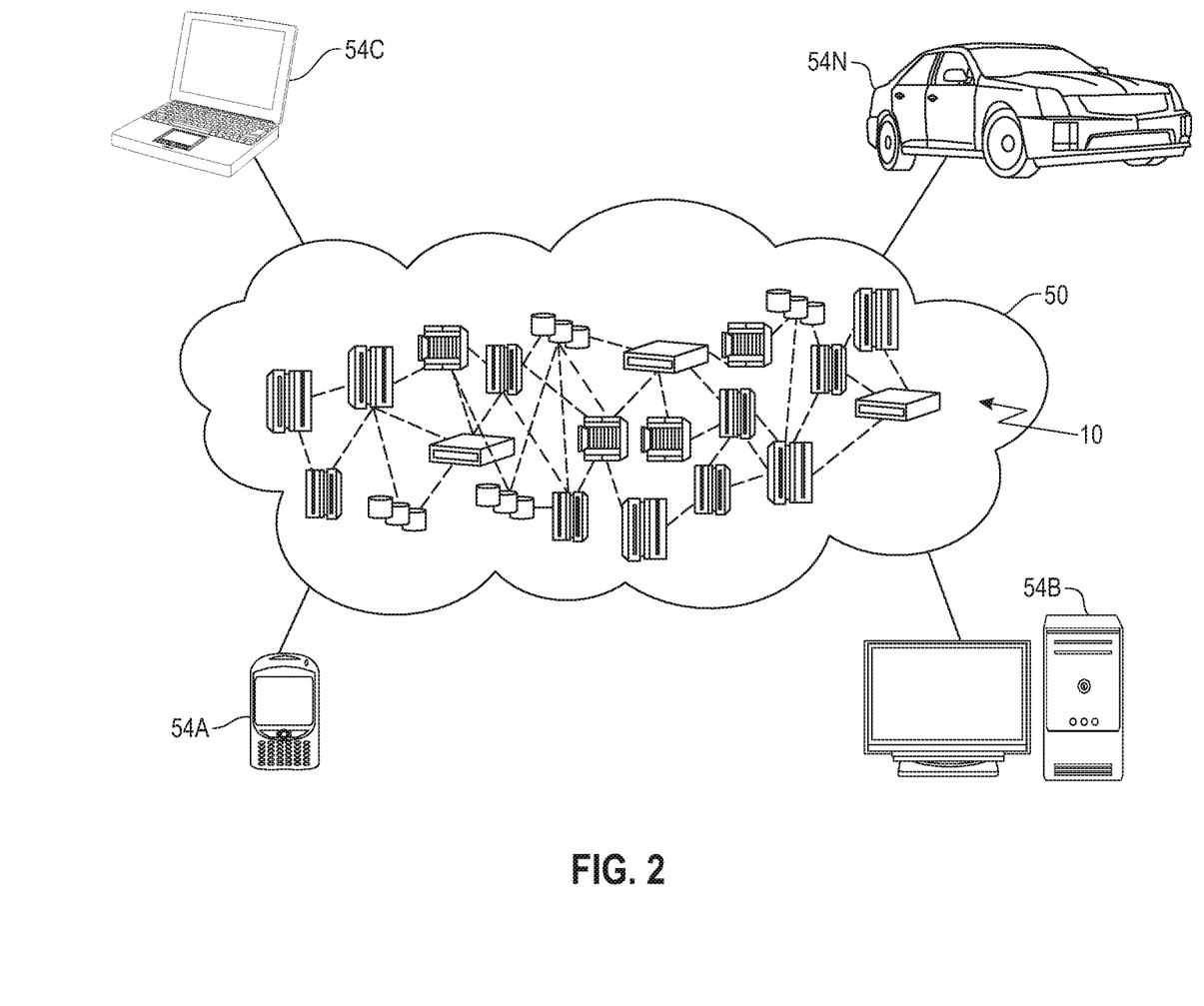
FIG. 2 depicts a cloud computing environment according to an embodiment.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A)-(54N) shown in FIG. 2 are intended to be illustrative only and that computing nodes (10) and cloud computing environment (50) can communicate with any type of computerized device over any type of network and/or network addressable connection (e.g., using a web browser).

Figure 3:
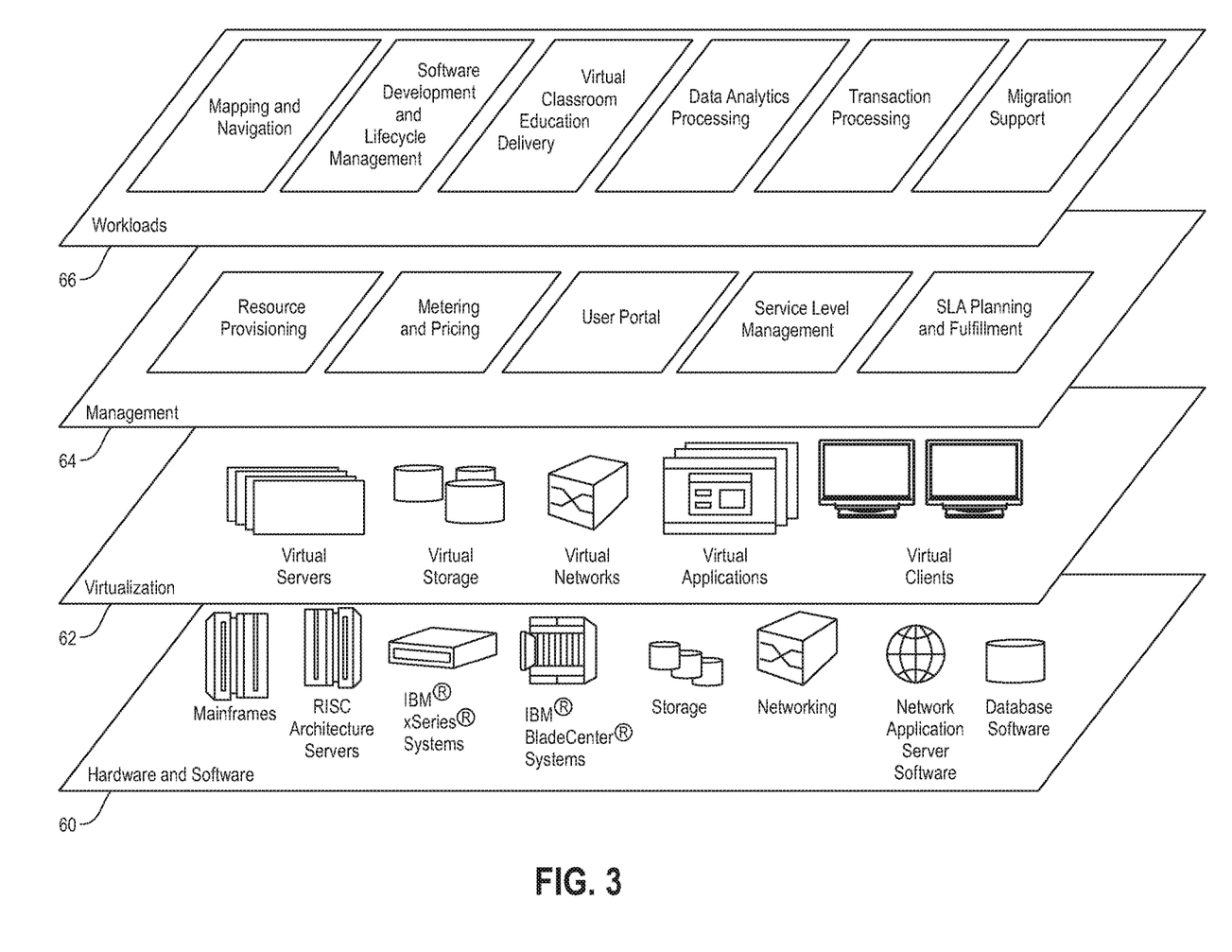
FIG. 3 depicts abstraction model layers according to an embodiment.

Referring now to FIG. 3, a set of functional abstraction layers provided by cloud computing environment (50) (FIG. 2) is shown. It should be understood in advance that the components, layers, and functions shown in FIG. 3 are intended to be illustrative only and the embodiments are not limited thereto. As depicted, the following layers and corresponding functions are provided: hardware and software layer (60), virtualization layer (62), management layer (64), and workload layer (66). The hardware and software layer (60) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers; virtual storage; virtual networks, including virtual private networks; virtual applications and operating systems; and virtual clients.

In one example, management layer (64) may provide the following functions: resource provisioning, metering and pricing, user portal, service level management, and SLA planning and fulfillment. The functions are described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer includes, but is not limited to: mapping and navigation; software development and lifecycle management; virtual classroom education delivery; data analytics processing; operation processing; and maintenance of consistent application data to support migration within the cloud computing environment.

In the shared pool of configurable computer resources described herein, hereinafter referred to as a cloud computing environment, applications may migrate to any data center, also referred to herein as a data site. There are two general scenarios in which an application is subject to migration, including a planned migration and an unplanned migration. In a planned migration, the application migrates to any data center, i.e. target site, in the cloud while maintaining disaster recovery support, and in an unplanned migration the application is subject to failure and recovers in any data center in the cloud while maintaining disaster recovery support. Accordingly, the difference between a planned migration and an unplanned migration is the failure and subsequent recovery of a failed application.

The source site is the primary location of data, and the target site provides a replica of the source data. In one embodiment, the source site operates in a read-write mode to support both read and write operations, and the target site operates in a read-only mode and is limited to supporting read operations. Continuous synchronization of source data with the target site is provided. In one embodiment, a failure of the source site is followed by a target site being upgraded to a new source site to support both read and write operations. Such an upgrade may require applications and/or tools to be migrated to the new source site to support the functionality of the new source site.

Figure 4:
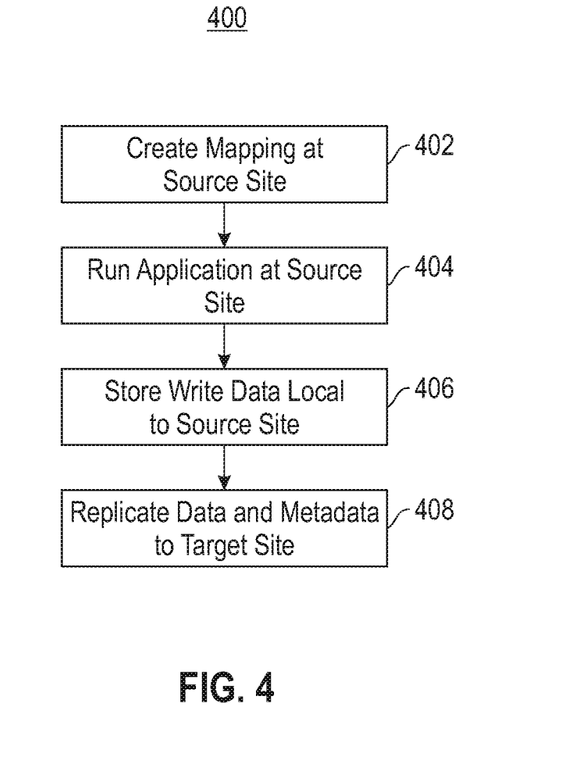
FIG. 4 depicts a flow chart illustrating a process for placing changes to the data and metadata at a source site in a queue for communication to a target site.

Data from the source site is defined at a file set level. In one embodiment, a fileset is a subtree of the filesystem namespace that provides an administrative boundary for data management. As such, the granularity of replication and consistency is a file set. The aspect of the defined granularity guarantees that all dependent writes across all files within a given file set are guaranteed to be ordered. FIG. 4 is a flow chart (400) illustrating the aspect of placing changes to the data and metadata at the source site in a queue for communication to the target site. Prior to placing any data and/or metadata changes in the queue, a mapping at the source site with file identifier spaces at the source and targets sites is created (402). More specifically, the inode numbers at the source site need to be mapped to the equivalent inode numbers at the target site, and the filenames at the source site may need to be mapped to the equivalent filenames at the target site.

An application runs at the source site (404). The application may support read and/or write operations. Data generated from a write operation is stored in data storage local to the source site in which the application is processing, e.g. local storage (406). At the same time, the data created from the write operation is replicated from the local data storage to backup data storage at the target site while the application continues to process one or more operations (408). The replication at step (408) includes both data and metadata from the write operation. The replication at step (408) may be conducted synchronously or asynchronously from one or more server nodes in the source site to one or more server nodes in the target site. Regardless of the format of the replication at step (408), a data consistency point is created on both the source and target data storage. The creation of the consistency point ensures that should the application be subject to a failure, the application can recover from a consistent data set.

A consistency point can be achieved using several different methods known to someone skilled in the art. In one embodiment, a filesystem or storage system snapshot is taken and copy-on-write semantics are employed to save data at a certain point-in-time without delaying application requests for an extended period of time. In one embodiment, any level of consistency can be used, including, but not limited to, application, crash, filesystem, etc. Accordingly, data and metadata from one or more write operations are stored in source data storage and replicated to target data storage, with creation of one or more consistency points in both data storage locations.

Periodic consistency points are created and maintained at both the source and target locations, with the consistency points functioning as recovery points in the event of a site failure. More specifically, a consistency point is taken local to the source site, and once all of the data reflected in the consistency point has been transmitted to the target site, a consistency point is created at the target site. Accordingly, as changes to data and metadata take place at the source site, these changes are reflected in a consistency point local to the source site, and communicated to the target site where a target consistency point is created local to the target site.

Figure 5:
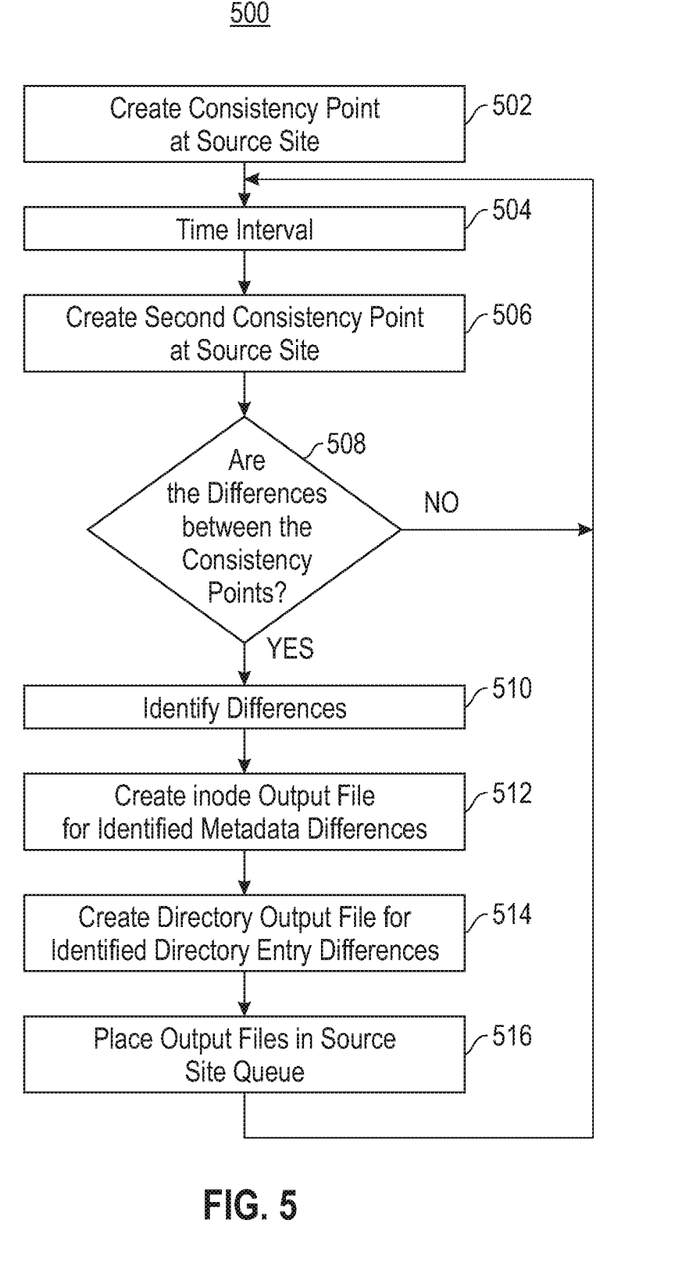
FIG. 5 depicts a flow chart illustrating a process for management of consistency points at the source site.

To support efficient use of network bandwidth, the transmission of consistency points from the source site to the target site may be limited to differences from a prior consistency point. FIG. 5 is a flow chart (500) illustrating a process for management of consistency points at the source site. A first consistency point is created local to the source site (502). Following a time interval (504), a second consistency point is created local to the source site (506). It is determined if there are any differences between the first and second consistency points (508). A positive response to the determination at step (508) is followed by identifying the specific differences (510). More specifically, the comparison of the consistency points at the source site includes searching both metadata as reflected in inodes, and data as reflected in directory entries that may have been created, deleted or modified. For any inode metadata that is identified as having a difference, an inode output file is created (512) and for any directory entries that are identified as having a difference, a directory output file is created (514). In one embodiment, it is not required to create and store the output file. More specifically, the difference(s) can be queued for replay at a secondary site directly without using an intermediate file, e.g. the output file. Similarly, in one embodiment, the output in either the form of a queue or file may be created in a single pass. The step of replaying the output file as a series of filesystem operations may take place concurrently or in parallel to the target site. In one embodiment, the filesystem operation(s) may be a standard and/or non-proprietary filesystem operation, such as a portable operating system interface for UNIX (POSIX) filesystem operation. Accordingly, one or more output files are created or a queue is implemented for replay of the identified metadata and data differences.

Following creation of any output files at steps (512) and/or (514), the output files are placed in an in-memory queue local to the source site (516). At the same time, the source site may continue to process read and write operations, which may include further changes to data and/or metadata. Following step (516) or a negative response to the determination at step (508), the process continues with a return to step (504), followed by repetition of creation of subsequent consistency points and comparison thereof. In one embodiment, the application of one or more differences between consistency points is not limited to successive consistency points. More specifically, the identified differences can be between any two consistency points. For example, the differences between two consistency points can be replayed to revert changes. If S1 and S2 are successive consistency points taken at times T1 and T2, respectively, and where T1 occurs before T2, the target site can be at a consistency point S1 and brought forward in time to S2, or the target site can be at a consistency point S2 and moved back in time to S1. The first and second consistency points are not always successive in time, the consistency points can be any two consistency points. Accordingly, consistency points are created on a periodic basis, with differences between compared consistency points identified and placed in a queue for communication to the target site.

It is recognized that there may be a communication failure between the source site and the target site. Failures occur for various reasons, and the details of such failures and their causes are not the subject of this disclosure. However, in the event of failure a disaster recovery is employed to establish or re-establish consistency at both the data and metadata levels between the source site and the target site. In one embodiment, the transmission of data in the queue occurs asynchronously in a continuous manner. If the source site experiences a node or site failure, the target site will not receive any changes that may have been in the queue at the time of failure. Following detection of a communication failure between the source and target sites, an algorithm is invoked to interpret and execute operations on the source site. The execution operations include two aspects associated with the consistency points, one aspect pertaining to differences of metadata and a second aspect pertaining to differences of data.

Figure 6:
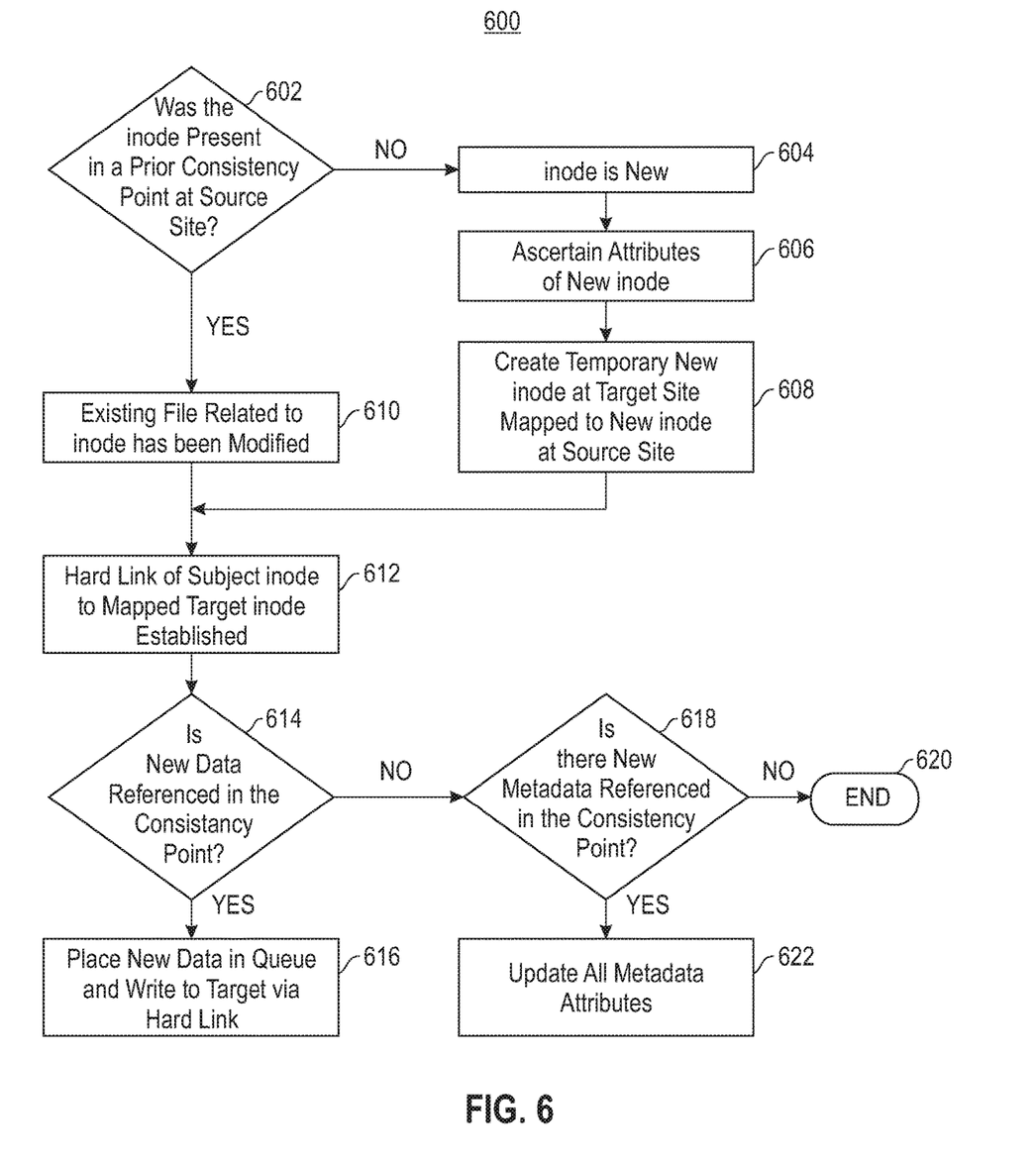
FIG. 6 depicts a flow chart illustrating a process for detection of failure of communication between the source and target sites, and the first aspect of management of a recovery to bring the target site up to date with the data and metadata in the source site.

FIG. 6 is a flow chart (600) illustrating a process for detection of a failure of communication between the source and target site, and the first aspect of management of a recovery to bring the target site up to date with the data and metadata in the source site. For each inode referenced in the most recent consistency point at the source site, it is determined if the inode was present in a prior consistency point at the source site (602). A negative response to the determination at step (602) is an indication that the subject inode is a new inode (604). The attributes of the new inode at the source site are ascertained (606), and a temporary new inode is create at the target site and mapped to the referenced new inode at the source site (608). Accordingly, for each new inode referenced in the most recent consistency point at the source node, a new inode is temporarily created at the target site.

Figure 7:
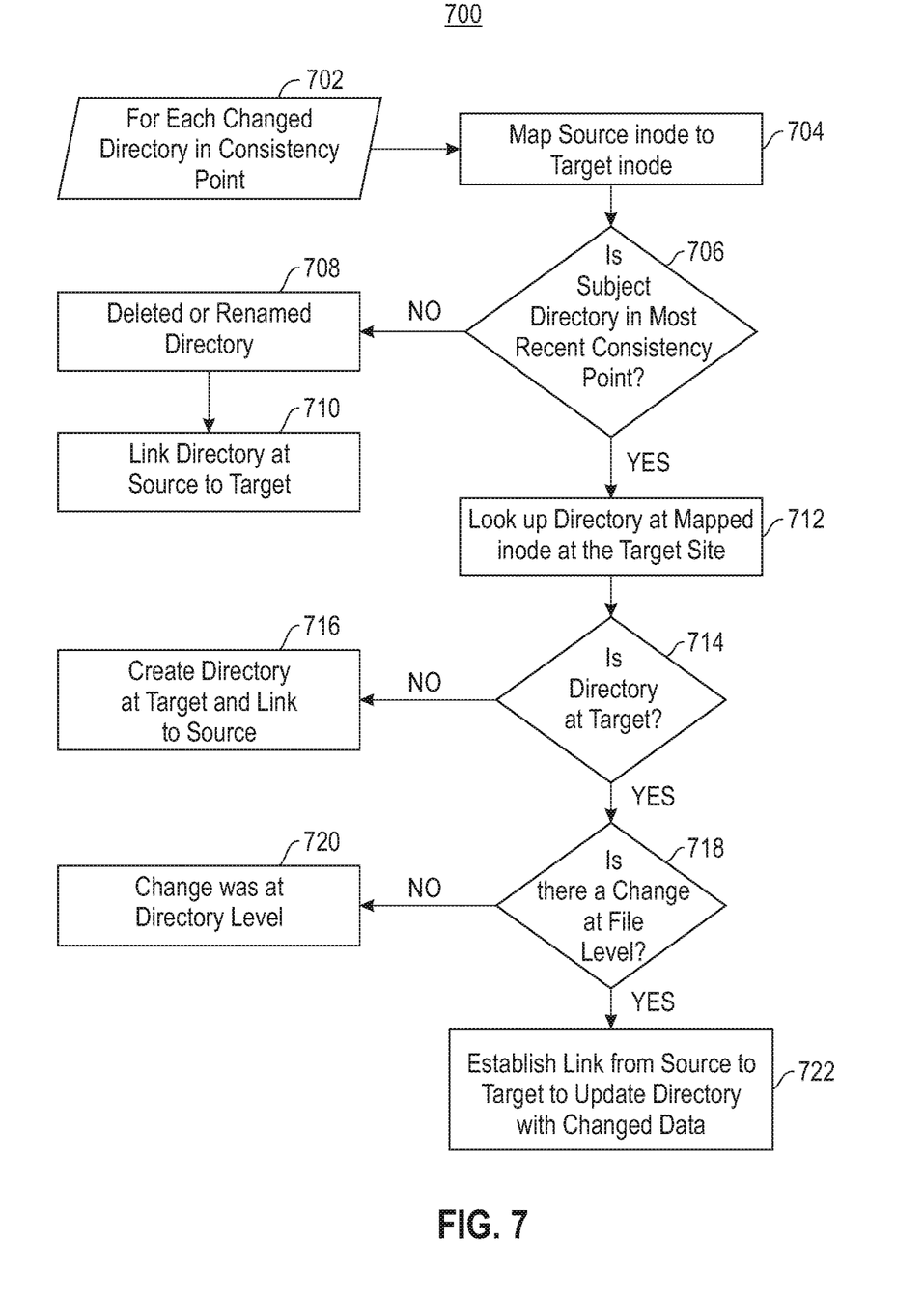
FIG. 7 depicts a flow chart illustrating a process for reconciling directory entries in two consistency points at the source site.

If at step (602), it is determined that the subject inode was present in the prior consistency point, then by reference this inode exists at the target site. The reference to the subject inode indicates that an existing file pertaining to the subject inode has been modified (610). Following either of steps (608) or (610), a hard link of the subject inode to the mapped target inode is established (612). In one embodiment, a hard link is a directory entry that associates a name with an existing file on a filesystem. Once the hard link is established, it is then determined if there is new data referenced in the subject consistency point and associated with the subject inode (614). A positive response to the determination at step (614) is followed by placing new data in the queue at the source site and writing the data to the target inode via the hard link (616). Details of updating the data on the target site are shown in FIG. 7 described below. A negative response to the determination at step (614) is followed by determining if there is new metadata referenced in the subject consistency point and associated with the subject inode (618). If the response to the determination at step (618) is negative, the reconciliation process of the metadata concludes (620). Conversely, a positive response to the determination at step (618) is followed by updating all of the metadata attributes from the consistency point in the source site to the target site (622). Accordingly, metadata consistency is maintained and reconciled between the source and target sites following a communication failure.

As referenced in FIG. 6, the differences between two consistency points at the source site may be present with respect to the data. FIG. 7 is a flow chart (700) illustrating a process for reconciling directory entries in two consistency points at the source site. For each identified changed directory (702), the source inode is mapped to the target inode (704). It is then determined if the subject directory is in the most recent consistency point (706). A negative response to the determination at step (706) is an indication that the subject directory has been either removed or renamed (708). A link for the subject directory is established from the source site to the target site (710). Accordingly, for each directory identified in the consistency point comparison to have been removed or renamed, a link is establish between the two site for communication of the changes from the source site to the target site.

However, a positive response to the determination at step (708) is an indication that the directory has already been established at the target site. As such, a positive response to the determination at step (706) is followed by looking up the subject directory at the mapped inode at the target site (712). It is then determined if the subject directory is present in the mapped inode (714). If the directory is not present, the directory is created at the target site and link to the subject directory at the source site (716). However, if the directory is present, it is then determined if there is a change at the file level noted in the consistency point comparison at the source site (718). A negative response to the determination at step (716) is an indication that the change was at the directory level (720). Conversely, a positive response to the determination at step (718) shows that the change is at the data level and a link from the source to the target is established to update the appropriate target inode and directory with the changed data (720). Accordingly, data consistency between the source and target sites is maintained at the directory level.

All filesystem operations performed at the source site are replayed in the same order at the target site, thereby guaranteeing write order and read stability. More specifically, identified differences between the source and target site consistency points are applied from the source site as a filesystem operation.

Figure 8:
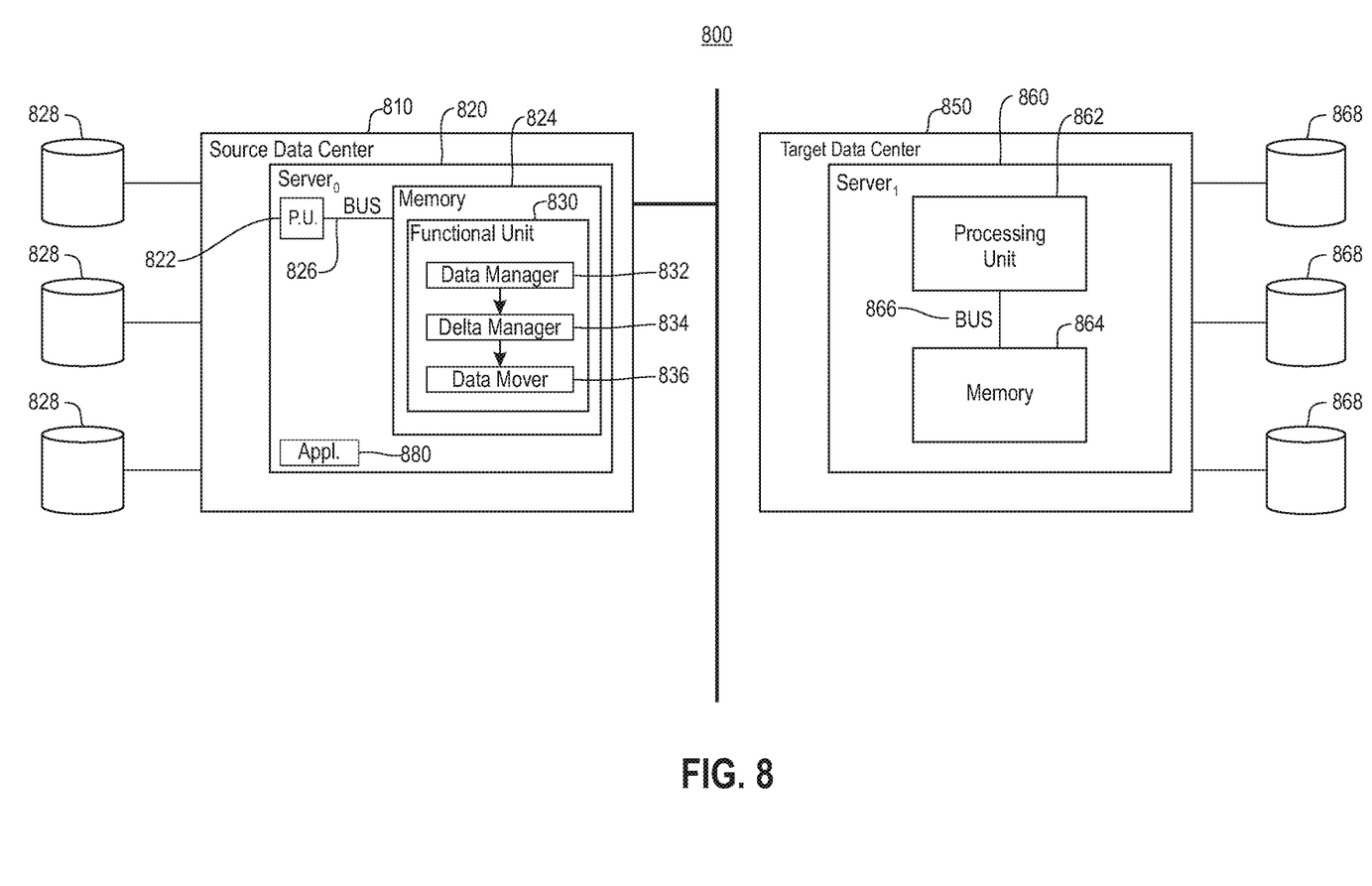
FIG. 8 depicts a block diagram illustrating tools embedded in a computer system to support the synchronization of data.

As demonstrated in the flow charts of FIGS. 4-7, a method is employed to support synchronization of data from a source site to a target site. More specifically, sequential consistency points are created, differences between the consistency points are identified, and the differences are replayed from the source site to a target site as a filesystem operation. In one embodiment, tools to support the synchronization, including creation of the consistency points, ascertaining differences between sequential consistency points, and converting the ascertained differences into filesystem operations for communication to the target site are all local to the source site. FIG. 8 is a block diagram (800) illustrating tools embedded in a computer system to support the synchronization of data as described above. More specifically, a shared pool of configurable computer resources is shown with a first data center (810) and a second data center (850). For purposes of description, the first data center (810) is referred to as a source site and the second data center (850) is referred to as a target site. Although only two data centers are shown in the example herein, the embodiments should not be limited to this quantity of data centers in the computer system. Accordingly, two or more data centers may be employed to support data synchronization.

Each of the data centers in the system is provided with at least one server in communication with data storage. More specifically, the first data center (810) is provided with a server (820) having a processing unit (822), in communication with memory (824) across a bus (826), and in communication with first local storage (828), and the second data center (850) is provided with a server (860) having a processing unit (862), in communication with memory (864) across a bus (866), and in communication with third local storage (868).

In the example shown herein, an application (880) processes read and write operations local to the first data center (810). Read operations are supported with data in the first local storage (828). Similarly, data from write operations are written to the first local storage (828). Several tools are provided to support synchronization of write data from the first data center (810) to the second data center (850). More specifically, a functional unit (830) is provided local to the first data center (810) in the shared pool and in communication with memory (824) of the server (820). The functional unit (830) manages the tools that support the data synchronization. The tools include, but are not limited to a data manager (832), a delta manager (834), and a data mover (836). The data manager (832) functions to process data at the source site (810) through the use of consistency points. More specifically, the data manager (832) creates consistency points of the filesystem, i.e. source filesystem, local to the source site (810) on a periodic basis.

Each of the created consistency points represents filesystem data and metadata at a point-in-time and function to establish a recovery point in the event of a failure. At a minimum, the data manager (832) creates a first consistency point at a first point-in-time and a second consistency point at a second point-in-time. In one embodiment, after the second consistency point is generated and replicated to the target site (850) the first consistency point may be deleted from the source site (810). Accordingly, the data manager (832) functions to capture at least two images of the source filesystem at different points in time.

As there are at least two consistency points of the source filesystem, the consistency points need to be communicated to the second data center (850) in the event of a communication failure between the first and second data center (810) and (850). To mitigate bandwidth utilization, the communication may be limited to the differences between the two consistency points. The delta manager (834) is provided in communication with the data manager (832), with the functionality of the delta manager (834) to support identification and management of such differences. More specifically, the delta manager (834) compares the first consistency point with the second consistency point and identifies any differences between the first and second consistency points. Accordingly, the delta manager (834) functions to identify differences at both the metadata and data level between two consistency points.

Finally, a data mover (836) is provided in communication with the delta manager (834) to manage application of the differences between the two consistency points as identified by the delta manager (834). More specifically, the data mover (836) generates an output file containing the identified differences, places the identified differences in a queue, and replays the output file as a filesystem operation. In one embodiment, the filesystem operation is replayed from the source site (810) to the target site (850) with the operation including multiple filesystem operations in a simultaneous manner. The filesystem operation employed by the data mover (836) replays only those changes that are reflected in the exact deltas as created by the delta manager (834). In one embodiment, the data mover (836) allows two or more file updates to be coalesced and transient metadata operations, e.g. temporary files, to be ignored. Because the data mover (836) replaces filesystem operations to communicate filesystem changes, the source site (810) and the target site (850) are not limited to homogeneous filesystems. In one embodiment, the source site (810) and the target site (850) may be heterogeneous filesystems. Accordingly, the data mover (836) is responsible for communicating the identified filesystem changes from the source site (810) to a target site (850) in the form of a filesystem operation.

As shown herein, filesystem changes are identified and synchronized from a source site (810) in a shared pool of resources to a target site (850). More specifically, the synchronization is supported by the data manager (832), delta manager (834), and data mover (836). In one embodiment, the synchronization of data from the source site (810) takes place in response to a fault in communication from the source site (810) to ensure that a consistent version of data at the target site (850) is maintained and progressing. Accordingly, consistency of data is maintained at two locations in the cloud to ensure that a replica of data from the source site is available at a secondary location.

As shown, the tools (832)-(836) are provided in the shared pool of configurable computer resources i.e. cloud, local to the source site (810). In one embodiment, the target site does not require any additional tools for computer program code to support the synchronization functionality. As identified above, the data manager, delta manager, and data mover, (832), (834), and (836) respectively, are shown residing in memory (824) of the server (820) local to the source data center (810). Although in one embodiment, the data manager, delta manager, and data mover (832), (834), and (836) respectively, may reside as hardware tools external to memory (824) of server (820), or they may be implemented as a combination of hardware and software. Similarly, in one embodiment, the managers (832)-(836) may be combined into a single functional item that incorporates the functionality of the separate items. As shown herein, each of the manager(s) are shown local to one data center. However, in one embodiment they may be collectively or individually distributed across the shared pool of configurable computer resources and function as a unit to manage synchronization of consistent data from the source site to the target site. Accordingly, the managers may be implemented as software tools, hardware tools, or a combination of software and hardware tools.

As will be appreciated by one skilled in the art, the aspects described herein may be embodied as a system, method or computer program product. Accordingly, the aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the aspects may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The aspects are described above with reference to flowchart illustrations and/or block diagrams of methods, apparatus (systems) and computer program products according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
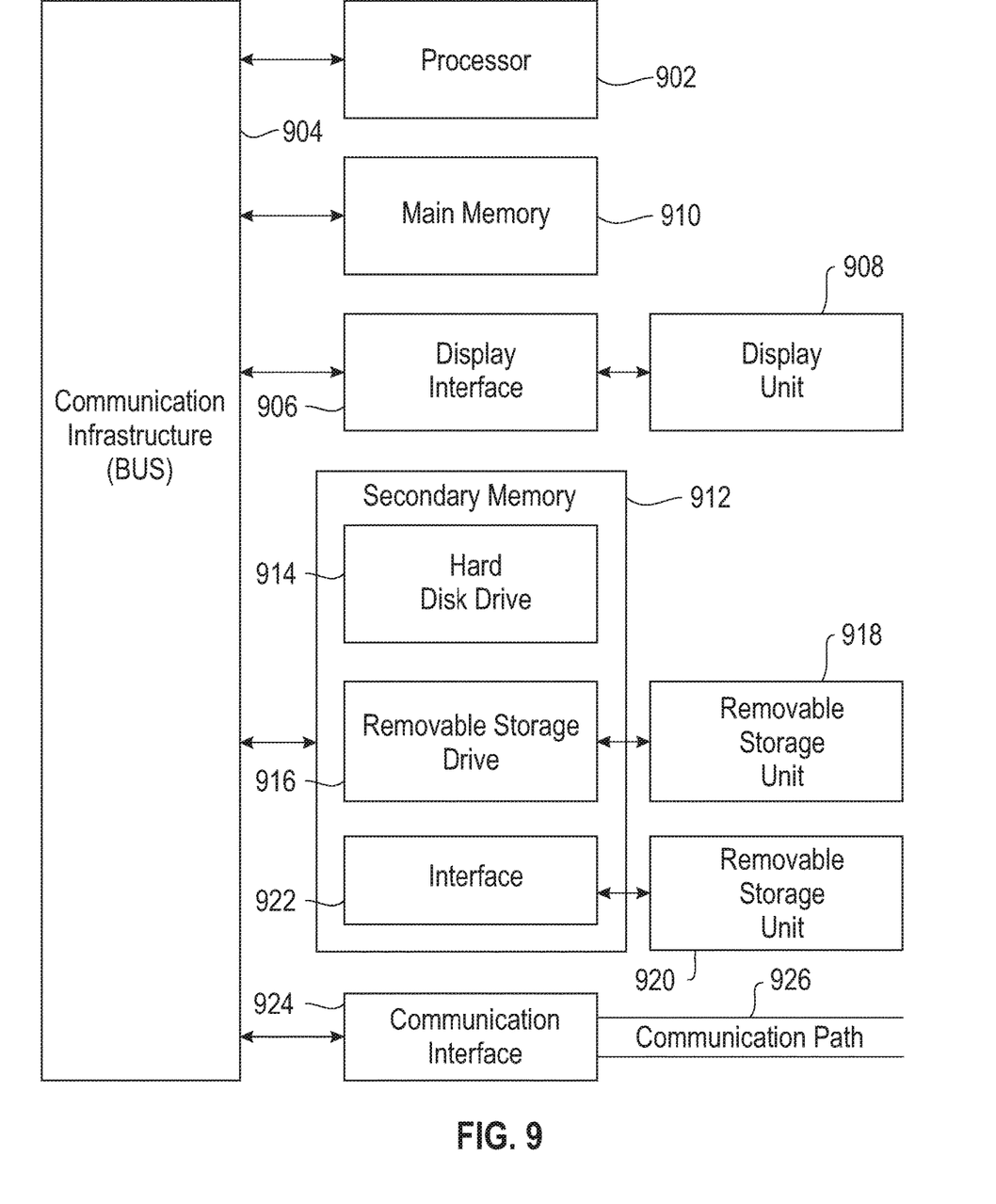
FIG. 9 depicts is a block diagram showing a system for implementing the tools of FIG. 8.

Referring now to FIG. 9 is a block diagram (900) showing a system for implementing the tools of FIG. 8. The computer system includes one or more processors, such as a processor (902). The processor (902) is connected to a communication infrastructure (904) (e.g., a communications bus, cross-over bar, or network). The computer system can include a display interface (906) that forwards graphics, text, and other data from the communication infrastructure (904) (or from a frame buffer not shown) for display on a display unit (908). The computer system also includes a main memory (910), preferably random access memory (RAM), and may also include a secondary memory (912). The secondary memory (912) may include, for example, a hard disk drive (914) and/or a removable storage drive (916), representing, for example, a floppy disk drive, a magnetic tape drive, or an optical disk drive. The removable storage drive (916) reads from and/or writes to a removable storage unit (918) in a manner well known to those having ordinary skill in the art. Removable storage unit (918) represents, for example, a floppy disk, a compact disc, a magnetic tape, or an optical disk, etc., which is read by and written to by removable storage drive (916). As will be appreciated, the removable storage unit (918) includes a computer readable medium having stored therein computer software and/or data.

In alternative embodiments, the secondary memory (912) may include other similar means for allowing computer programs or other instructions to be loaded into the computer system. Such means may include, for example, a removable storage unit (920) and an interface (922). Examples of such means may include a program package and package interface (such as that found in video game devices), a removable memory chip (such as an EPROM, or PROM) and associated socket, and other removable storage units (920) and interfaces (922) which allow software and data to be transferred from the removable storage unit (920) to the computer system.

The computer system may also include a communications interface (924). Communications interface (924) allows software and data to be transferred between the computer system and external devices. Examples of communications interface (924) may include a modem, a network interface (such as an Ethernet card), a communications port, or a PCMCIA slot and card, etc. Software and data transferred via communications interface (924) are in the form of signals which may be, for example, electronic, electromagnetic, optical, or other signals capable of being received by communications interface (924). These signals are provided to communications interface (924) via a communications path (i.e., channel) (926). This communications path (926) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (910) and secondary memory (912), removable storage drive (916), and a hard disk installed in hard disk drive (914).

Computer programs (also called computer control logic) are stored in main memory (910) and/or secondary memory (912). Computer programs may also be received via a communication interface (924). Such computer programs, when run, enable the computer system to perform the features of the embodiments as discussed herein. In particular, the computer programs, when run, enable the processor (902) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The foregoing description has been presented for purposes of illustration and description, but is not intended to be exhaustive or limited in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the various embodiments with various modifications as are suited to the particular use contemplated. Accordingly, the enhanced cloud computing model supports flexibility with respect to application processing and disaster recovery, including, but not limited to, supporting separation of the location of the data from the application location and selection of an appropriate recovery site.

It will be appreciated that, although specific embodiments have been described herein for purposes of illustration, various modifications may be made without departing from the spirit and scope of the embodiments. In particular, the system can be configured to support planned and unplanned synchronization of data and metadata operating at the first data center. Accordingly, the scope of protection is limited only by the following claims and their equivalents.

We claim:

1. A method comprising:
    creating one or more consistency points in a source filesystem, including creating a first consistency point at a first point-in-time and a second consistency point at a second point-in-time, wherein each consistency point represents filesystem data and metadata at a point-in-time to establish a recovery point, and wherein the first consistency point and the second consistency point are any two consistency points;
    detecting a directory change at the source filesystem, including comparing the first consistency point with the second consistency point and identifying at least one difference between the first and second consistency points based on the comparison; and
    communicating the detected directory change to a target filesystem including:
        identifying a file level change associated with a target filesystem directory based on the detected directory change and a mapping between the source and target filesystems;
        and
        updating the target filesystem directory based on the file level change.

2. The method of claim 1, wherein the comparison detects a presence of a new source filesystem inode, and wherein updating the target file system directory comprises mapping the new source filesystem inode to a target filesystem inode.

3. The method of claim 1, wherein updating the target file system directory comprises identifying filesystem operations on filesystem objects using file names.

4. The method of claim 1, further comprising generating an output file based on the comparison, and replaying the output file as a series of filesystem operations.

5. The method of claim 4, wherein the output file is replayed after communication failure between the source filesystem and the target filesystem.

6. The method of claim 1, wherein the source and target filesystems are heterogeneous filesystems.

7. The method of claim 1, wherein updating the target file system directory further comprises reverting changes to the target filesystem directory utilizing the identified file level change.

8. The method of claim 1, further comprising creating a third consistency point in the source filesystem at a third point-in-time, the third consistency point being sequential with the first and second consistency point, and removing the first consistency point.

9. A system comprising:
    a source server having a processing unit in communication with memory, wherein the source server is associated with a source filesystem;
    a functional unit in communication with the source server, the functional unit to:
        create one or more consistency points in a source filesystem, including create a first consistency point at a first point-in-time and a second consistency point at a second point-in-time, wherein each consistency point represents filesystem data and metadata at a point-in-time to establish a recovery point, and wherein the first consistency point and the second consistency point are any two consistency points;
        detect a directory change at the source filesystem, including compare the first consistency point with the second consistency point and the functional unit to identify at least one difference between the first and second consistency points based on the comparison; and
        communicate the detected directory change to a target filesystem including:

identify a file level change associated with a target file system directory based on the detected directory change and a mapping between the source and target filesystems; and update the target file system directory based on the file level change.

10. The system of claim 9, wherein the comparison detects a presence of a new source filesystem inode, and wherein updating the target filesystem directory comprises the functional unit to map the new source filesystem inode to a target filesystem inode.

11. The system of claim 9, wherein updating the target filesystem directory comprises the functional unit to identify filesystem operations on filesystem objects using file names.

12. The system of claim 9, further comprising the functional unit to generate an output file based on the comparison, and replay the output file as a series of filesystem operations, wherein the output file is replayed after communication failure between the source filesystem and the target filesystem.

13. The system of claim 9, wherein the source and target filesystems are heterogeneous filesystems.

14. The system of claim 9, wherein updating the target filesystem further comprises the functional unit to revert changes to the target filesystem directory utilizing the identified file level change.

15. The system of claim 9, further comprising the functional unit to create a third consistency point in the source filesystem at a third point-in-time, the third consistency point being sequential with the first and second consistency point, and remove the first consistency point.

16. A computer program product comprising computer readable storage device having computer readable program code embodied therewith, the program code executable by a processor to:

create one or more consistency points in a source filesystem, including create a first consistency point at a first point-in-time and a second consistency point at a second point-in-time, wherein each consistency point represents filesystem data and metadata at a point-in-time to establish a recovery point, and wherein the first consistency point and the second consistency point are any two consistency points;

detect a directory change at the source filesystem, including compare the first consistency point with the second consistency point and the functional unit to identify at least one difference between the first and second consistency points based on the comparison; and communicate the detected directory change to a target filesystem including:
identify a file level change associated with a target filesystem directory based on the detected change and a mapping between the source and target filesystems; and update the target filesystem directory based on the file level change.

17. The computer program product of claim 16, wherein the comparison detects a presence of a new source filesystem inode, and wherein updating the target filesystem directory comprises program code to map the new source filesystem inode to a target filesystem inode.

18. The computer program product of claim 16, wherein updating the target filesystem directory comprises program code to identify filesystem operations on filesystem objects using file names.

19. The computer program product of claim 16, further comprising program code to generate an output file based on the comparison, and replay the output file as a series of filesystem operations, wherein the output file is replayed after communication failure between the source filesystem and the target filesystem.

20. The computer program product of claim 16, further comprising the functional unit to create a third consistency point in the source filesystem at a third point-in-time, the third consistency point being sequential with the first and second consistency point, and remove the first consistency point.

* * * * *